(12) United States Patent
Yu et al.

(10) Patent No.: US 8,751,051 B2
(45) Date of Patent: Jun. 10, 2014

(54) SWITCH CONTROL SYSTEM

(75) Inventors: Xiang Yu, Shenzhen (CN); Xiao-Yong Ma, Shenzhen (CN); Qi Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 368 days.

(21) Appl. No.: 13/211,582

(22) Filed: Aug. 17, 2011

(65) Prior Publication Data

US 2012/0265351 A1 Oct. 18, 2012

(30) Foreign Application Priority Data

Apr. 18, 2011 (CN) .......................... 2011 1 0096670

(51) Int. Cl.
*G05D 9/00* (2006.01)
(52) U.S. Cl.
USPC ................................ 700/281; 703/8; 318/625
(58) Field of Classification Search
USPC ................................ 700/281; 703/8; 318/625
See application file for complete search history.

(56) References Cited

U.S. PATENT DOCUMENTS

| | | | |
|---|---|---|---|
| 5,208,753 A * | 5/1993 | Acuff | 701/50 |
| 5,884,986 A * | 3/1999 | Shimizu | 303/122.12 |
| 5,904,126 A * | 5/1999 | McKay et al. | 123/196 S |
| 5,936,520 A * | 8/1999 | Luitje et al. | 340/517 |
| 7,032,435 B2 * | 4/2006 | Hassenflug | 73/46 |
| 7,176,648 B2 * | 2/2007 | Choi | 318/625 |
| 2004/0158444 A1* | 8/2004 | Hasenour | 703/8 |
| 2005/0258795 A1* | 11/2005 | Choi | 318/625 |

* cited by examiner

*Primary Examiner* — Mohammad Ali
*Assistant Examiner* — Anthony Whittington
(74) *Attorney, Agent, or Firm* — Novak Druce Connolly Bove + Quigg LLP

(57) ABSTRACT

A switch control system for controlling an electrically conductive fluid supply to a tank, includes a detection circuit, a gate circuit, a control circuit and a switch circuit. The detection circuit detects a fluid level in the tank and outputs a voltage level signal. The gate circuit receives the voltage level signal and outputs control signals accordingly. The control circuit receives the control signals and outputs a first voltage and a second voltage accordingly. The switch circuit receives the first voltage and the second voltage and turns on and turns off the electrically conductive fluid supply to the tank in accordance with the first voltage and the second voltage.

9 Claims, 6 Drawing Sheets

SWITCH CONTROL SYSTEM

BACKGROUND

1. Technical Field

The present disclosure relates to switch control systems, and particularly to a switch control system for controlling an electrically conductive fluid to a tank by means of a solenoid valve.

2. Description of Related Art

A solenoid valve is an electromechanical valve for use with liquid or gas. The valve is controlled by an electric current through the solenoid: in the case of a two-port valve the flow is switched on or off; in the case of a three-port valve, the outflow is switched between the two outlet ports. Solenoid valves are the most frequently used control elements for fluids. Their tasks are to shut off, release, dose, distribute or mix fluids. However, a typical solenoid valve is controlled by a single pole which has a deformable structure inside. The deformable structure tends to assume a naturally-deformed state over thousands of operations, which may cause the solenoid valve to fail or operate ineffectively.

Therefore there is a need for improvement in the art.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
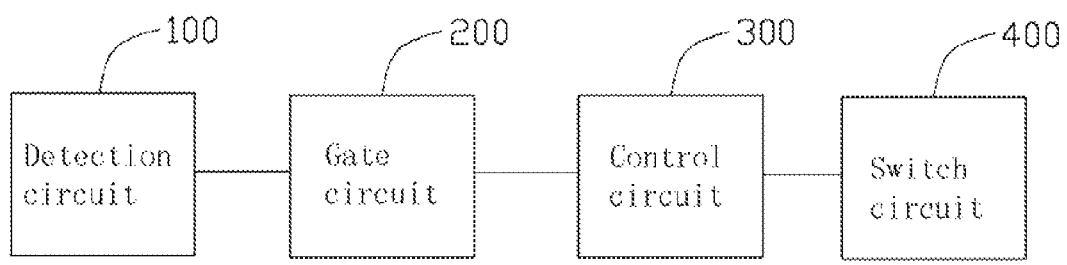
FIG. 1 is a block view of an embodiment of a switch control system.
Figure 2:
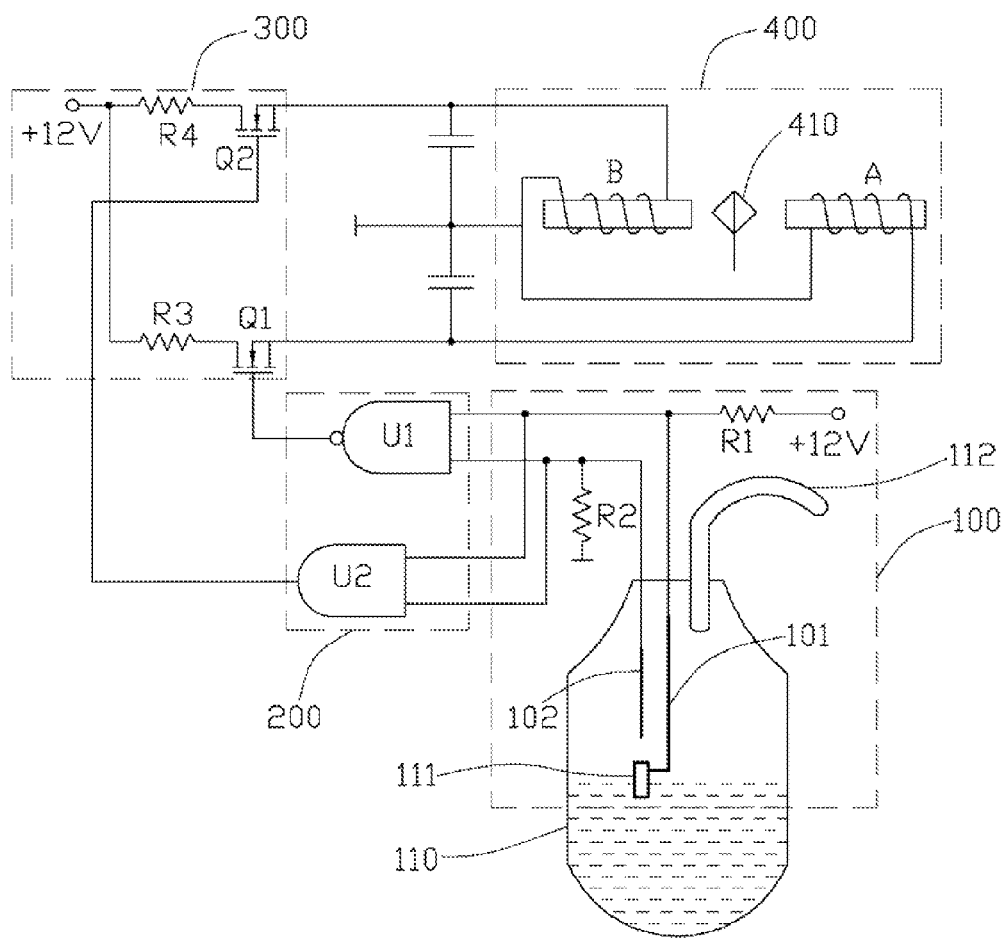
FIG. 2 is a circuit view of the switch control system of FIG. 1.
Figure 3:
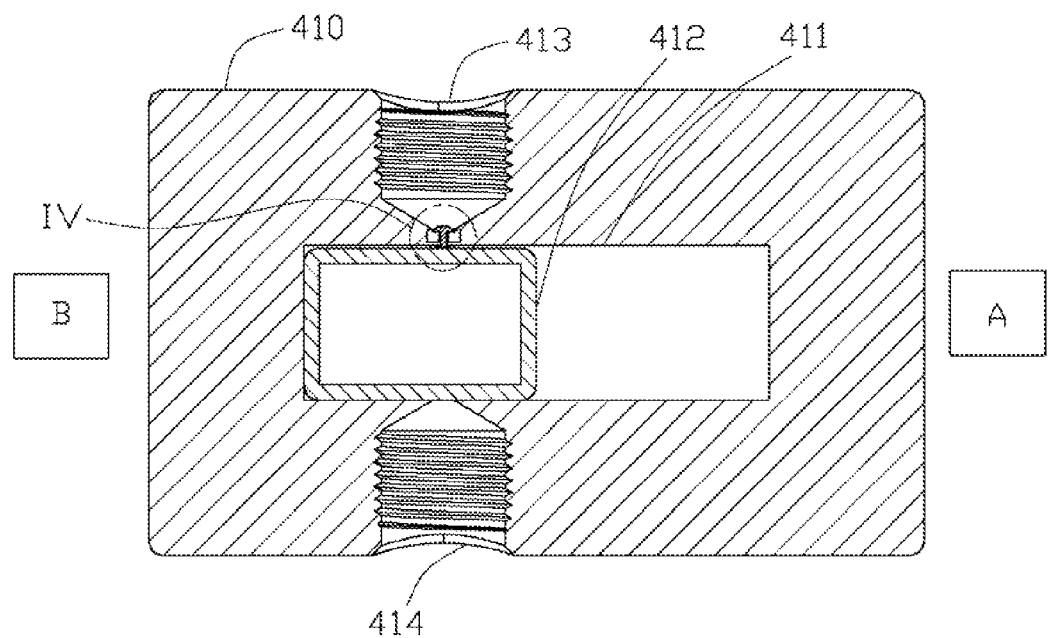
FIG. 3 is a sectional view of the control valve in FIG. 2, when the switch control system is in a closed state.
Figure 4:
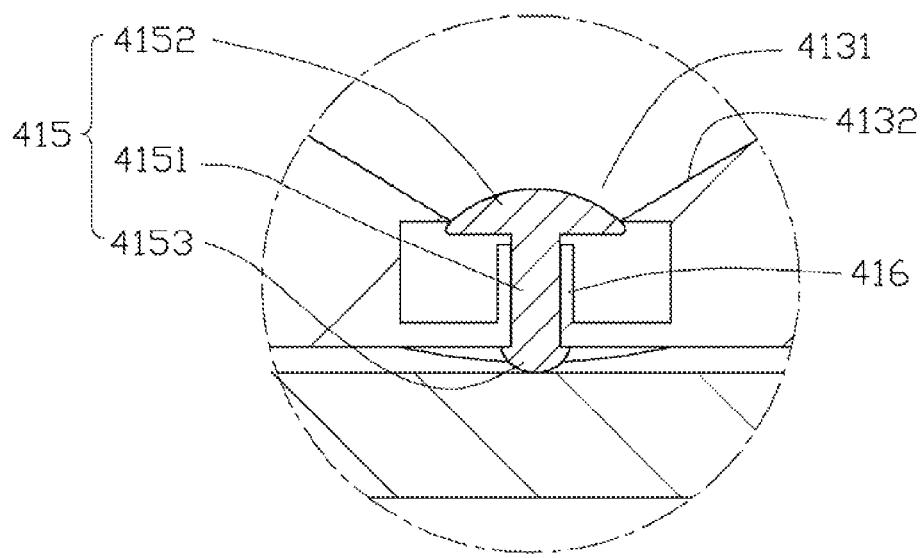
FIG. 4 is a partially enlarged, isometric view of the control valve of FIG. 3, showing section IV.
Figure 5:
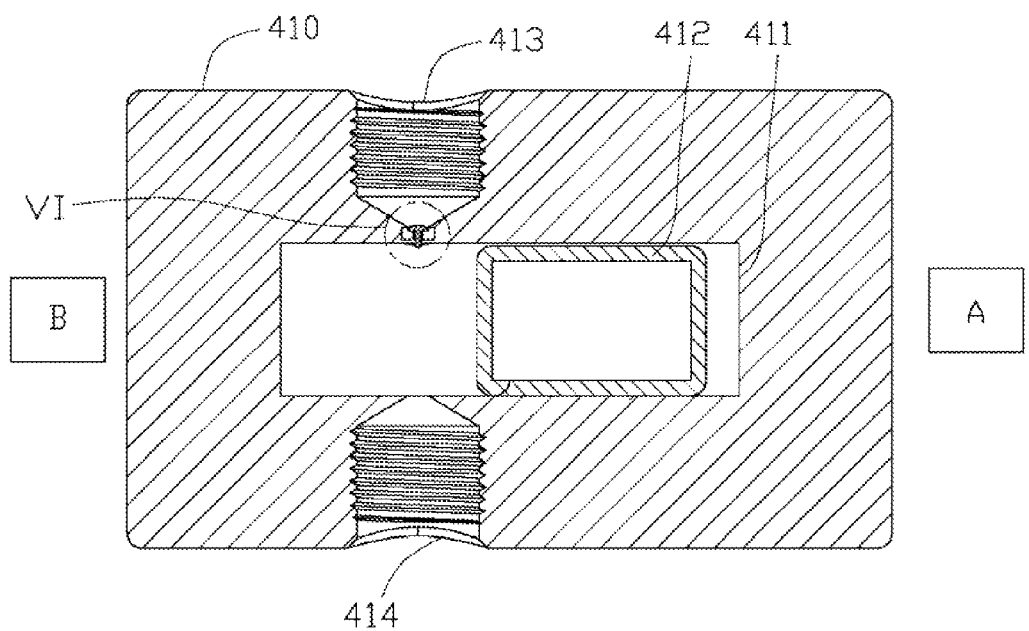
FIG. 5 is a sectional view of the control valve in FIG. 2, when the switch control system is in an open state.
Figure 6:
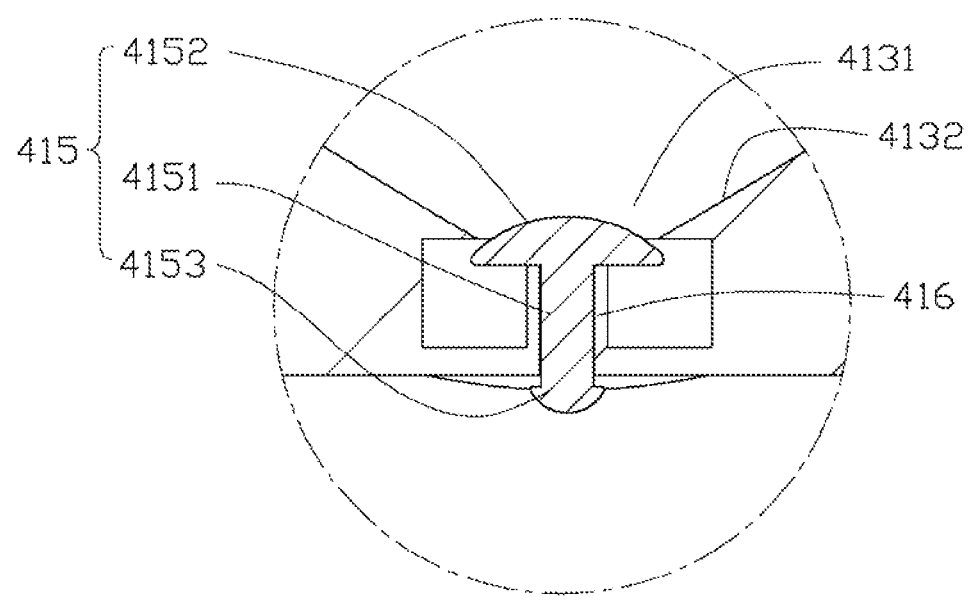
FIG. 6 is a partially enlarged, isometric view of the control valve of FIG. 5, showing section VI in a different state.

Referring to FIGS. 1 and 2, a switch control system for controlling an electrically conductive fluid supply to a tank 110, includes a detection circuit 100, a gate circuit 200, a control circuit 300 and a switch circuit 400.

The detection circuit 100 detects a fluid level in the tank 110 and outputs a voltage level signal in accordance with the fluid level. The gate circuit 200 receives the voltage level signal and outputs control signals in accordance with the voltage level signal. The control circuit 300 receives the control signals and outputs a first voltage and a second voltage in accordance with the control signals. The switch circuit 400 receives the first voltage and the second voltage and turns on and turns off the electrically conductive fluid supply to the tank in accordance with the first voltage and the second voltage.

Referring to FIG. 2, the detection circuit 100 includes a first detecting member 101 and a second detecting member 102. The first detecting member 101 includes a first detecting member first terminal and a first detecting member second terminal. The second detecting member 102 includes a second detecting member first terminal and a second detecting member second terminal. The first detecting member first terminal is electrically connected to a fluid level detector 111 in the tank 110. The first detecting member second terminal receives a +12 volts DC voltage via a first resistor R1. The second detecting member first terminal is idle. The second detecting member second terminal outputs the voltage level signal. When the fluid level in the tank 110 reaches a threshold fluid level, the first detecting member 101 and the second detecting member 102 are electrically connected together.

The gate circuit 200 includes a NAND gate chip U1 and an AND gate chip U2. The NAND gate chip U1 includes a NAND gate chip first input terminal, a NAND gate chip second input terminal and a NAND gate chip output terminal. The AND gate chip U2 includes an AND gate chip first input terminal, an AND gate chip second input terminal and an AND gate chip output terminal. The NAND gate chip first input terminal and the AND gate chip first input terminal are electrically connected to the first detecting member second terminal. The NAND gate chip second input terminal and the AND gate chip second input terminal are electrically connected to the second detecting member second terminal. The NAND gate chip second input terminal and the AND gate chip second input terminal are electrically connected and grounded via a second resistor R2. The NAND gate chip output terminal and the AND gate chip output terminal output the control signals.

The control circuit 300 includes a first MOSFET Q1 and a second MOSFET Q2. The first MOSFET Q1 includes a first MOSFET gate, a first MOSFET source and a first MOSFET drain. The second MOSFET Q2 includes a second MOSFET gate, a second MOSFET source and a second MOSFET drain. The first MOSFET gate is electrically connected to the NAND gate chip output terminal. The first MOSFET drain receives the +12 volts DC voltage via a third resistor R3. The first MOSFET source outputs the first voltage. The second MOSFET gate is electrically connected to the AND gate chip output terminal. The second MOSFET drain receives the +12 volts DC voltage via a fourth resistor R4. The second MOSFET source outputs the second voltage. In one embodiment, the first MOSFET Q1 and the second MOSFET Q2 are N-channel MOSFETs.

Referring to FIGS. 3 to 6, the switch circuit 400 includes a first pole A, a second pole B and a control valve 410. The control valve 410 defines a space 411 therein. A core member 412 is installed in the space 411. A fluid inlet opening 413 is defined in a top wall of the space 411. A fluid outlet opening 414 is defined in a bottom wall of the space 411. The fluid outlet opening 414 is connected to a fluid inlet pipe 112 of the tank 110. A fluid outlet hole 4131 is defined at a bottom of the fluid inlet opening 413. A restriction block 415 is installed between the space 411 and the fluid outlet hole 4131. The first pole A is electrically connected to the first MOSFET source for receiving the first voltage. The second pole B is electrically connected to the second MOSFET source for receiving the second voltage.

The first pole A and the second pole B attract the core member 412 moving in the space 411 toward the first pole A and the second pole B according to the first voltage and the second voltage. The restriction block 415 includes a columned connection portion 4151. A spherical first crown portion 4152 extends from a top of the connection portion 4151. A spherical second crown portion 4153 extends from a bottom of the connection portion 4151. Two arched supporting members 416 perpendicularly extend from below the fluid outlet hole 4131, toward an inner space of the fluid inlet opening 413. Two diagonal resisting portions 4132 are formed on two sides of the fluid outlet hole 4131.

In use, when the fluid level in the tank 110 is higher than the threshold fluid level, the first detecting member 101 and the second detecting member 102 are electrically connected together. The first detecting member second terminal and the second detecting member second terminal both output the +12 volts DC voltage. The NAND gate chip output terminal outputs a low level control signal. The AND gate chip output terminal outputs a high level control signal. The first MOSFET gate receives the low level control signal and the first MOSFET Q1 is turned off. The second MOSFET gate receives the high level control signal and the second MOSFET Q2 is turned on.

The +12 volts DC voltage provides the second voltage to the second pole B via the second MOSFET Q2. The second pole B attracts the core member 412 across the space 411. A top of the core member 412 resists the second crown portion 4153 to push the restriction block 415 toward the fluid inlet opening 413. The first crown portion 4152 moves toward the fluid outlet hole 4131 until the restriction block 415 resists against the two resisting portions 4132 and prevents flow of the electrically conductive fluid to the fluid outlet opening 414.

When the fluid level in the tank 110 is lower than the threshold fluid level, the first detecting member 101 and the second detecting member 102 are opened. The first detecting member second terminal outputs the +12 volts DC voltage. The second detecting member second terminal does not output any voltage. The NAND gate chip output terminal outputs a high level control signal. The AND gate chip output terminal outputs a low level control signal. The first MOSFET gate receives the high level control signal and the first MOSFET Q1 is turned on. The second MOSFET gate receives the low level control signal and the second MOSFET Q2 is turned off.

The +12 volts DC voltage provides the second voltage to the first pole A via the first MOSFET Q1. The first pole A attracts the core member 412 across the space 411. The top of the core member 412 releases the second crown portion 4153. The restriction block 415 moves away from the fluid inlet opening 413. The first crown portion 4152 moves away from the fluid outlet hole 4131 until the restriction block 415 separates from the two resisting portions 4132. Gaps are formed between the two resisting portions 4132 and the first crown portion 4152 and the electrically conductive fluid may flow.

In one embodiment, the two supporting members 416 hold the first crown portion 4152 when the restriction block 415 separates from the two resisting portions 4132, in order to prevent the loss of the restriction block 415 into the space 411. The switch circuit 400 turns on and turns off the electrically conductive fluid supply to the tank 110 via the first pole A and the second pole B. Therefore the tendency to deform caused by a single pole in a typical solenoid valve is avoided.

Even though numerous characteristics and advantages of the present disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A switch control system for controlling an electrically conductive fluid supply to a tank, comprising:

a detection circuit adapted to detect a fluid level in the tank and output a voltage level signal in accordance with the fluid level;

a gate circuit adapted to receive the voltage level signal and output control signals in accordance with the voltage level signal;

a control circuit adapted to receive the control signals and output a first voltage and a second voltage in accordance with the control signals; wherein the control circuit comprises a first MOSFET and a second MOSFET; and a switch circuit adapted to receive the first voltage and the second voltage and turn on and turn off the electrically conductive fluid supply to the tank in accordance with the first voltage and the second voltage; wherein the switch circuit comprises a first pole, a second pole and a control valve; a core member is installed in the control valve; when the fluid level in the tank is higher than a threshold fluid level, the detection circuit is adapted to output a low voltage level signal; the gate circuit output control signals to turn off the first MOSFET and turn on the second MOSFET; the second pole is adapted to receive the second voltage from the second MOSFET; the second pole is adapted to attract the core member moving in the control valve; and the control valve is adapted to turn off the electrically conductive fluid supply to the tank.

2. The switch control system of claim 1, wherein the detection circuit comprises a first detecting member and a second detecting member; the first detecting member comprises a first detecting member first terminal and a first detecting member second terminal; the second detecting member comprises a second detecting member first terminal and a second detecting member second terminal; the first detecting member first terminal is electrically connected to a fluid level detector in the tank; the first detecting member second terminal is adapted to receive a DC voltage; the second detecting member first terminal is adapted to be idled; the second detecting member second terminal is adapted to output the voltage level signal; and when the fluid level in the tank reaches the threshold fluid level, the first detecting member and the second detecting member are electrically connected together.

3. The switch control system of claim 2, wherein the gate circuit comprises a NAND gate chip and an AND gate chip; the NAND gate chip comprises a NAND gate chip first input terminal, a NAND gate chip second input terminal and a NAND gate chip output terminal; the AND gate chip comprises an AND gate chip first input terminal, an AND gate chip second input terminal and an AND gate chip output terminal; the NAND gate chip first input terminal and the AND gate chip first input terminal are electrically connected to the first detecting member second terminal; the NAND gate chip second input terminal and the AND gate chip second input terminal are electrically connected to the second detecting member second terminal; the NAND gate chip second input terminal and the AND gate chip second input terminal are electrically connected and grounded; and the NAND gate chip output terminal and the AND gate chip output terminal are adapted to output the control signals.

4. The switch control system of claim 3, wherein the first MOSFET comprises a first MOSFET gate, a first MOSFET source and a first MOSFET drain; the second MOSFET comprises a second MOSFET gate, a second MOSFET source and a second MOSFET drain; the first MOSFET gate is electrically connected to the NAND gate chip output terminal; the first MOSFET drain is adapted to receive the DC voltage; the first MOSFET source is adapted to output the first voltage; the second MOSFET gate is electrically connected to the AND gate chip output terminal; the second MOSFET drain is adapted to receive the DC voltage; and the second MOSFET source outputs the second voltage.

5. The switch control system of claim 4, wherein the first pole is electrically connected to the first MOSFET source for receiving the first voltage; the second pole is electrically connected to the second MOSFET source for receiving the second voltage; and the first pole and the second pole are adapted to attract the core member moving in the control valve according to the first voltage and the second voltage.

6. The switch control system of claim 5, wherein when the fluid level in the tank is lower than the threshold fluid level, the detection circuit is adapted to output a high voltage level signal; the gate circuit output control signals to turn on the first MOSFET and turn off the second MOSFET; the first pole is adapted to receive the first voltage from the first MOSFET; the first pole is adapted to attract the core member moving in the control valve; and the control valve is adapted to turn on the electrically conductive fluid supply to the tank.

7. The switch control system of claim 5, wherein the first MOSFET and the second MOSFET are N-channel MOSFETs.

8. The switch control system of claim 1, wherein the control valve defines a cave therein; the core member is installed in the cave; a fluid inlet opening is defined in a top wall of the cave; a fluid outlet opening is defined in a bottom wall of the cave; and the fluid outlet opening is connected to a fluid inlet pipe of the tank.

9. The switch control system of claim 8, wherein a fluid outlet hole is defined at a bottom of the fluid inlet opening; a restriction block is installed between the cave and the fluid outlet hole; the restriction block comprises a columned connection portion; a spherical first crown portion extended from a top of the columned connection portion; a spherical second crown portion extended from a bottom of the columned connection portion; when the second pole is adapted to attract the core member moving in the control valve, a top of the core member is adapted to resist the spherical second crown portion; the spherical first crown portion is adapted to move toward and plug the fluid outlet hole; when the first pole is adapted to attract the core member moving in the control valve, the top of the core member is adapted to release the spherical second crown portion; the spherical first crown portion is adapted to move away from and separate from the fluid outlet hole.

* * * * *